United States Patent
Stark

[15] 3,656,259
[45] Apr. 18, 1972

[54] WINDOW GUIDANCE SYSTEM FOR THE SLIDING WINDOW OF A MOTOR VEHICLE

[72] Inventor: Karl Stark, Sindelfingen, Germany
[73] Assignee: Daimler-Benz Aktiengesellschaft, Stuttgart-Unterturkheim, Germany
[22] Filed: Mar. 9, 1970
[21] Appl. No.: 17,608

[30] Foreign Application Priority Data

Mar. 8, 1969 Germany .................... P 19 11 843.5

[52] U.S. Cl. ............................................................49/440
[51] Int. Cl. .........................................................E05d 15/16
[58] Field of Search ...................................49/410–413, 415, 49/416, 428, 436, 440, 441, 350, 351

[56] References Cited

UNITED STATES PATENTS 2,180,920  11/1939  Churchill .............................49/436
3,328,918  7/1967  Brissette et al. ......................49/415
3,333,364  8/1967  Herr .....................................49/411

FOREIGN PATENTS OR APPLICATIONS 111,947  12/1917  Great Britain ......................49/440
838,862  6/1960  Great Britain ......................49/440

Primary Examiner—Kenneth Downey
Attorney—Craig, Antonelli and Hill

[57] ABSTRACT

Window guide for the sliding windows of a motor vehicle, characterized in that the lateral guide rails making up the guide frame of the window terminate at about the height of the belt line of the car body, that is at the door locks, and at least two guide bodies of synthetic material provided with hollow opposed cheeks are fastened to a mounting rail arranged stationary in the window pit at one side of the window and at least a corresponding guide body is fastened to a mounting at the other side of the window.

8 Claims, 5 Drawing Figures

INVENTOR
KARL STARK

BY Craig, Antonelli,
Stewart & Hill
ATTORNEYS

WINDOW GUIDANCE SYSTEM FOR THE SLIDING WINDOW OF A MOTOR VEHICLE

The invention relates to a window guidance system for the sliding window of a motor vehicle and has the purpose of eliminating the difficulties of up and down movement especially of arched or curved window panes, which may, for example, be caused by inaccuracies in the manufacture.

In order to protect the window guidance system and entrance slots of the window in the window pit from undesirable entrance of water or dust, a tight contact of the sliding surfaces of the window pane and guidance is necessary. However, the sealing of these sliding surfaces over the entire length of the guidance is difficult.

In accordance with the present invention, these disadvantages are avoided by an arrangement wherein the lateral guide rails of the window terminate at about the height of the belt line or longitudinal centerline of the car body, that is at about the door locks, at least two guide bodies of synthetic material each provided with a pair of oppositely disposed, hollow D-shaped guide cheeks are fastened at a stationary mounting arranged at one side of the window pane in the window pit, and at least a corresponding guide body is fastened to a mounting at the other side of the window pane.

In an advantageous embodiment of the inventive window guidance system the upper guide body consisting of a total of two guide members fastened to a holding rail is arranged at the lower end of the guide frame and is spaced at such a distance from the lower guide body that the window pane in its lower end position engages safely between the guide cheeks of the lower guide body. A guide body arranged at the opposite side of the window pane is located in about the central plane between the upper and lower guide body at the other side of the window pane.

The guide bodies consist appropriately of water-resistant, wear-resistant and noiseless as well as temperature-stable, synthetic material advantageously selected from the class of materials known as polyacetal resins.

Finally, the arrangement of the guide bodies in the pit at both sides of the window may be accomplished in such a way that two mountings may be arranged each with one guide body at each side.

Instead of the arrangement of the guide bodies mentioned above, wherein the guide bodies are positioned at the corners of an equal sided triangle, more than two guide bodies may be arranged at one side with unequal spacing, also the opposite side may be provided at an arbitrary height and arbitrary spacing depending on how a favorable, that is, frictionless window guidance could be best constructed.

Fastening the guide bodies to the mounting may be accomplished by the use of an expanding mandrel of the same tough elastic synthetic material of which the guide cheeks are made whereby the mandrel is expanded by pressing a shaft through an opening in the bridge of the guide body arranged in the middle of the two D-shaped hollow guide cheeks.

In place of a single mounting each for each guide at both sides of the window pane, a corner holding rail for a number of guide bodies may be provided.

It is an object of the present invention to provide a guide arrangement for motor vehicle windows which eliminates or substantially avoids the disadvantages inherent in known arrangements of a similar type.

It is another object of the present invention to provide a window guide arrangement which is silent and wear resistant and temperature stable in the required range.

It is a further object of the present invention to provide a window guide arrangement which is of simple and economic construction and provides for secure guiding especially for curved windows.

These and other objects, features and advantages of the present invention will be more apparent from the following detailed description of the invention, when taken with the accompanying drawings, which illustrate one exemplary embodiment, and wherein.

Figure 1:
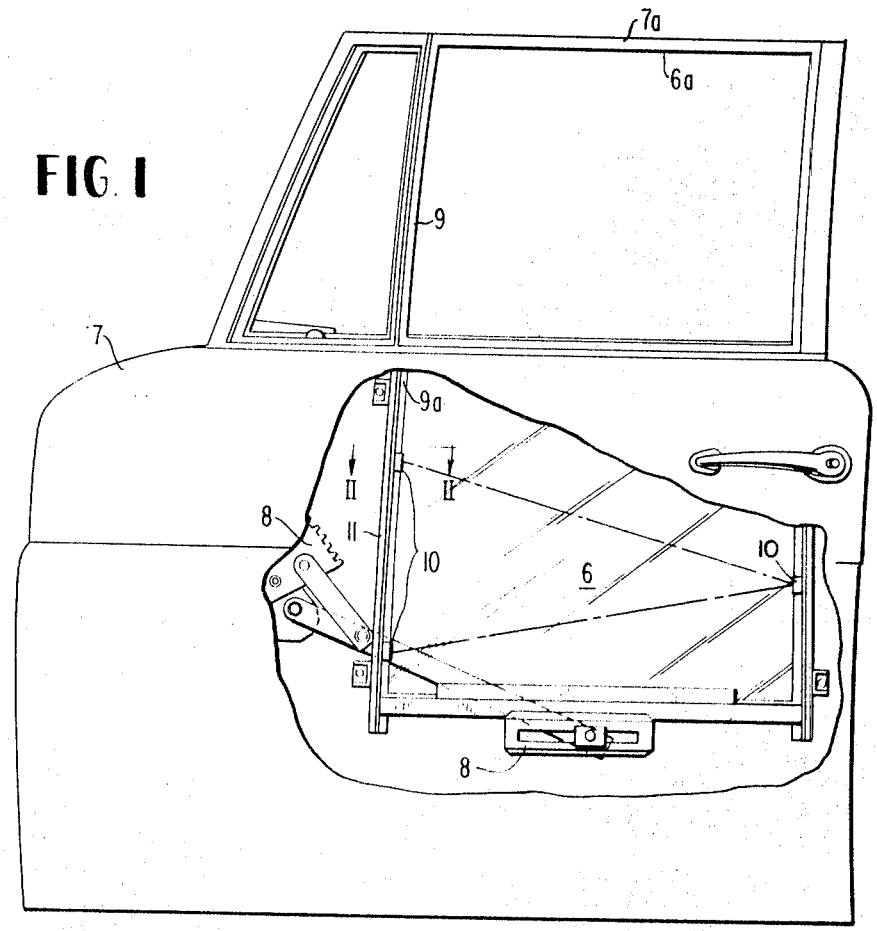
FIG. 1 shows the door of a motor vehicle viewed from the side with the outer body partially removed.

Looking now to the drawings in more detail, wherein like elements are designated by similar reference numerals wherever possible, and particularly to FIG. 1, the sliding window 6 in the door 7 of a motor vehicle is constructed as a frameless window pane. A conventional window lifting device 8 serves to open and close the window pane in the well-known manner. The window opening 6a is bordered by a solid door frame 7a.

In the range of the window opening 6a, the window pane 6 slides in a guide frame 9 made from the usual U-shaped rails which open toward the interior of the opening 6a, which rails are covered on the inside with a plush covering in the well-known manner. The rails of the guide frame terminate at about the height of the door fastening, that is at the belt line of the car body and extend thereby somewhat into the window pit.

Figure 2:
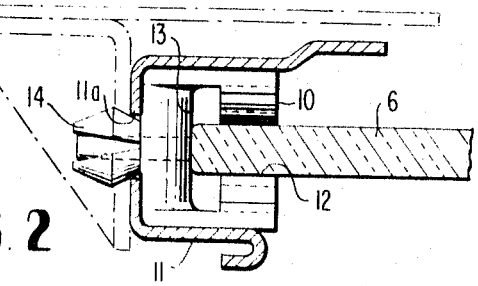
FIG. 2 shows a crossection taken along line II—II in FIG. 1.

In the plane of the line of steepest gradient of the side rails of the guide frame 9, two guide bodies 10 are arranged at one side of the window pane 6 (FIGS. 1 and 2). With these two guide bodies 10 at one side of the window pane, a guide body of the same construction is arranged at the opposite side of the window pane which is also fastened to a mounting. The arrangement of this guide body is at a height which, in regard to the intended requirement of minimum sliding friction, good guiding characteristic, good wear resistance and noiselessness, is most favorable. This will be in about the central plane between the two guide bodies 10 at the other side of the window pane so that all three guide bodies 10 are arranged at the corners of an equal-sided or at least an isosceles triangle.

For mounting of the pair of guide bodies 10 at one window side, a flat rail 11 may be provided in the plane of the side rails of the guide frame 9 and fastened to the door 7. The upper guide body 10 is advantageously fastened to the holding rail 11 at a small distance from the lower end 9a of the vertical guide rail 9. The lower guide body 10 may also be fastened to the holding rail 11 at about one third of the window height of the entirely lowered window pane 6 by means of a holder provided at this point. The guide body at the other window side (not shown) may be arranged in about the central plane of the guide body pair 10.

Each guide body 10 (FIGS. 3 to 5) is approximately U-shaped as seen in crossection whereby the two opposed legs 15 are provided at the inner sides 15a with elastically yielding guide cheeks 12 are hollow approximately D-shaped members, one opposed to the other. The bridge 13 which joins the two legs 15 is provided with a bore 13b in the center extending parallel to the legs 15. The shaft 14a of an expanding mandrel 14 is pressed into the bore 13b for expanding the mandrel to effect the fastening of the guide body 10 onto the holding rail 11. The guide cheeks 12 serve as a guidance for the side edges of the sliding window 6.

Figure 3:
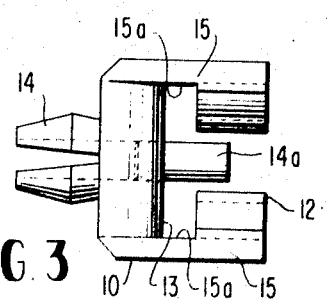
FIGS. 3 to 5 show the detail of the guide body in three views.
Figure 4:
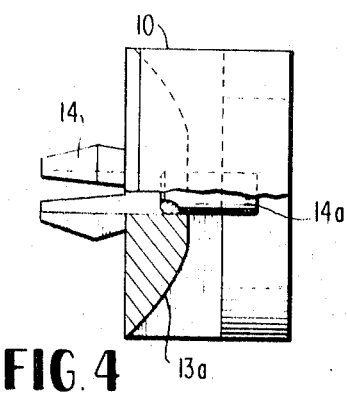
Figure 5:
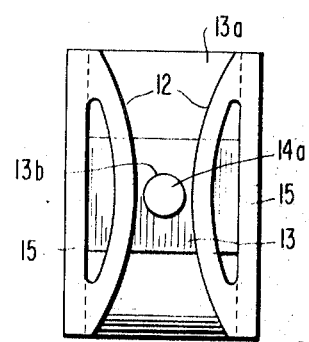

In FIGS. 3 to 5 the expanding mandrel 14 is shown in a position, in which the shaft 14a is not pressed completely into the bridge 13 of the guide body 10. In the process of fastening the guide body 10, the expandable end of the expanding mandrel 14 is pressed into an opening 11a of the holding rail 11 by such an amount that the part of the shaft 14a, previously extending out of the opening 13b is pressed entirely into the bridge 13. Bridge 13 is chamfered at its outer ends or is dome-shaped in order to facilitate entrance of the window edges.

Appropriately, the guide body 10 and the expanding mandrel 14 consist of a suitable tough elastic synthetic material. It must be water and solvent resistant, wear resistant, of low noise as well as temperature stable. A synthetic material from the group of polyacetal resins does have these characteristics to a great extent.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What I claim is:

1. A window guide, for the sliding windows of a motor vehicle door, comprising a pair of lateral guide rails positioned on respective sides of a window opening in the vehicle door and extending down into the door to approximately the height of the horizontal plane through the longitudinal center line of the vehicle, and at least two guide bodies fastened in the door in substantial alignment with one of said guide rails and at least a corresponding guide body fastened in the door in substantial alignment with the other of said guide rails, said guide bodies each being provided with opposed hollow arch-shaped guide cheeks for gripping a window on respective sides thereof, wherein said guide bodies are made of a synthetic material and have a generally U-shaped configuration with the legs thereof being substantially D-shaped.

2. A window guide as defined in claim 1, wherein said guide bodies are positioned at the corners of an isosceles triangle.

3. A window guide as defined in claim 1, wherein the upper one of said two guide bodies fastened in alignment is positioned adjacent the lower end of said one of said lateral guide rails and the lower of said two guide bodies being spaced from the upper guide body so that both guide bodies securely engage a window in its fully lowered position.

4. A window guide as defined in claim 3, wherein the guide body positioned opposite said two guide bodies lies in about the central plane between the upper and lower guide bodies.

5. A window guide as defined in claim 1, wherein said U-shaped guide body is fastened to a holding rail positioned to extend from said lateral guide rails by means of an expanding mandrel fastener extending through a bore in the bridge portion which connects the two legs of said U-shaped guide body.

6. A window guide as defined in claim 5, wherein said bridge portion of each U-shaped guide body is provided with end surfaces that are inclined in relation to the lateral edges of a window sliding thereover.

7. A window guide as defined in claim 1, wherein said guide bodies are made of a synthetic material selected from the group of materials known as polyacetal resins.

8. The combination of claim 6, wherein both the guide body and the expanding mandrel fastening means are made of a synthetic material selected from the group of materials known as polyacetal resins.

* * * * *